(12) United States Patent
Hsieh et al.

(10) Patent No.: US 7,797,584 B2
(45) Date of Patent: Sep. 14, 2010

(54) SATA INTERFACE TESTER AND TESTING METHOD

(75) Inventors: Ming-Chih Hsieh, Taipei Hsien (TW); Kuang-Lung Ko, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 469 days.

(21) Appl. No.: 11/836,798

(22) Filed: Aug. 10, 2007

(65) Prior Publication Data
US 2008/0294943 A1 Nov. 27, 2008

(30) Foreign Application Priority Data
May 22, 2007 (CN) .................. 2007 1 0200665

(51) Int. Cl.
*G06F 11/00* (2006.01)
(52) U.S. Cl. .......................... 714/43; 714/44
(58) Field of Classification Search .................. 714/43, 714/44
See application file for complete search history.

(56) References Cited

U.S. PATENT DOCUMENTS

| | | | |
|---|---|---|---|
| 6,199,122 B1* | 3/2001 | Kobayashi | 710/36 |
| 6,976,190 B1* | 12/2005 | Goldstone | 714/42 |
| 2004/0215421 A1* | 10/2004 | Schmitz et al. | 702/183 |
| 2006/0046562 A1* | 3/2006 | Ou Yang et al. | 439/541.5 |
| 2006/0182229 A1* | 8/2006 | Cheong | 379/1.01 |
| 2006/0259278 A1* | 11/2006 | Schmitz et al. | 702/183 |
| 2006/0291547 A1* | 12/2006 | Hsu | 375/226 |
| 2007/0061632 A1* | 3/2007 | Uddenberg et al. | 714/44 |

* cited by examiner

*Primary Examiner*—Bryce P Bonzo
(74) *Attorney, Agent, or Firm*—Frank R. Niranjan

(57) ABSTRACT

A serial advanced technology attachment (SATA) interface tester includes a memory, a signal converter, at least one SATA interface, and an indicator. The at least one SATA interface is adapted to connect with SATA interfaces of a motherboard, and is electrically connected to the memory via the signal converter. The signal converter receives serial signals from the motherboard via the at least one SATA interface and converts them to parallel signals and then passes the parallel signals to the memory to perform a writing process. The signal converter receives parallel signals from the memory and converts them to serial signals and passes the serial signals to the motherboard via the at least one SATA interface to perform a reading process. The indicator is electrically connected to the memory for indicating testing result of the SATA interfaces of the motherboard.

7 Claims, 2 Drawing Sheets

SATA INTERFACE TESTER AND TESTING METHOD

BACKGROUND

1. Field of the Invention

The present invention relates to testers and corresponding testing methods, and particularly to a tester and a corresponding testing method for testing serial advanced technology attachment (SATA) interfaces.

2. Description of Related Art

Nowadays, SATA hard disk drives (HDDs) are broadly used for storage of data in computers, and corresponding SATA interfaces are designed in motherboards of the computers for connecting to the SATA HDDs. Before selling or using the motherboard, the SATA interfaces need to be tested. A conventional method for testing the SATA interfaces is using some conventional SATA HDDs to directly connect with the SATA interfaces, and inspecting work status of the SATA HDDs to judge whether the SATA interfaces are good or not.

However, this conventional method may require a large number of SATA HDDs to connect with the SATA interfaces of the motherboards in test lines, which increases testing cost. In addition, because this method utilizes SATA HDDs any problems with the SATA HDDS, even minor ones, may influence test results.

What is desired, therefore, is to provide a tester and a corresponding testing method for conveniently testing SATA interfaces without need of SATA HDDs.

SUMMARY

An exemplary serial advanced technology attachment (SATA) interface tester includes a memory, a signal converter, at least one SATA interface, and an indicator. The at least one SATA interface is adapted to connect with SATA interfaces of a motherboard, and is electrically connected to the memory via the signal converter. The signal converter receives serial signals from the motherboard via the at least one SATA interface and converts them to parallel signals and then passes the parallel signals to the memory to perform a writing process. The signal converter receives parallel signals from the memory and converts them to serial signals and passes the serial signals to the motherboard via the at least one SATA interface to perform a reading process. The indicator is electrically connected to the memory for indicating testing result of the SATA interfaces of the motherboard.

Other advantages and novel features of the present invention will become more apparent from the following detailed description of an embodiment when taken in conjunction with the accompanying drawings, in which:

DETAILED DESCRIPTION

Figure 1:
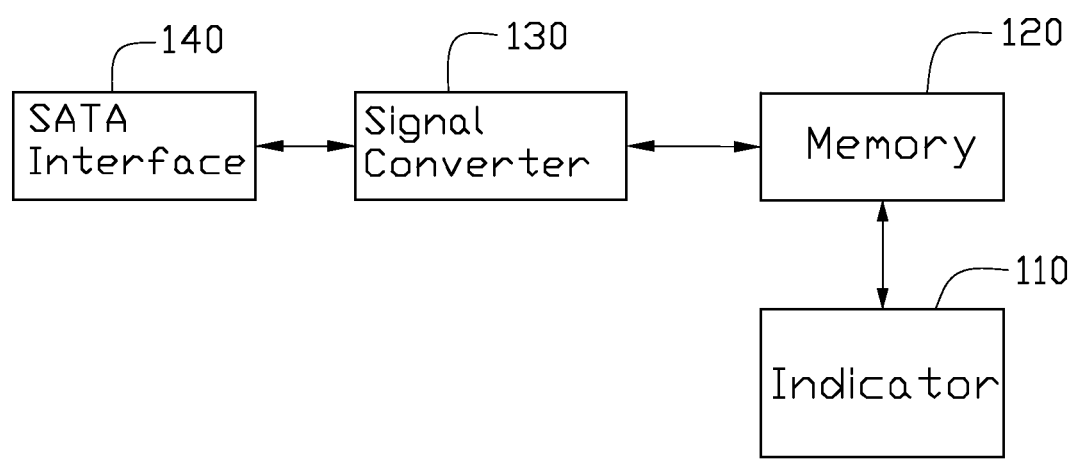
FIG. 1 is a block diagram of a SATA interface tester in accordance with an embodiment of the present invention.

Referring to FIG. 1, a SATA interface tester in accordance with an embodiment of the present invention includes an indicator 110, a memory 120 adapted for simulating storage function of a SATA HDD, a signal converter 130, and a SATA interface 140 adapted for connecting to SATA interfaces of a motherboard which need to be tested. An amount of the SATA interface 140 of the SATA interface tester can be more than one for testing more than one SATA interface of the motherboard at the same time.

The indicator 110 is connected to the memory 120. The memory 120 is connected to the SATA interface 140 via the signal converter 130. The signal converter 130 can convert parallel signals from the memory 120 to serial signals and transmit them to the SATA interface 140, and can convert serial signals from the SATA interface 140 to parallel signals and transmit them to the memory 120. The memory 120 controls the indicator 110 to indicate testing results of the SATA interfaces of the motherboard.

Before testing, a testing program and a test value are stored in the basic input/output system (BIOS) of the motherboard and the memory 120 of the SATA interface tester. In this embodiment, the test values stored in the BIOS and the memory 120 are the same. In other embodiments, the test values of the BIOS and the memory 120 may be different, but the testing programs should be amended accordingly. The testing programs stored in the BIOS and the memory 120 each have a counter. The counters are both initialized at zero, then to achieve an alternating result of zero one zero one . . . each time the counters are incremented to achieve a command signal, modular arithmetic is performed on the current values held in the counters. If the current value stored in each of the counters is zero, the modular arithmetic performed on the values using a modulo of 2 will result in a zero and the testing programs of the BIOS and the memory 120 will perform a writing process. If the current value stored in each of the counters is one, the modular arithmetic performed on the values using a modulo of 2 will result in a one and the testing programs of the BIOS and the memory 120 will perform a reading process. After a writing process or a reading process, the current value stored in the counters of the testing programs of the BIOS and the memory 120 are incremented by one and modular arithmetic is performed again, and the next process is performed, and so on. In this embodiment, modular arithmetic is used with a modulo of two, but other methods could be used to achieve the result of alternating ones and zeroes to sequence the test processes.

Figure 2:
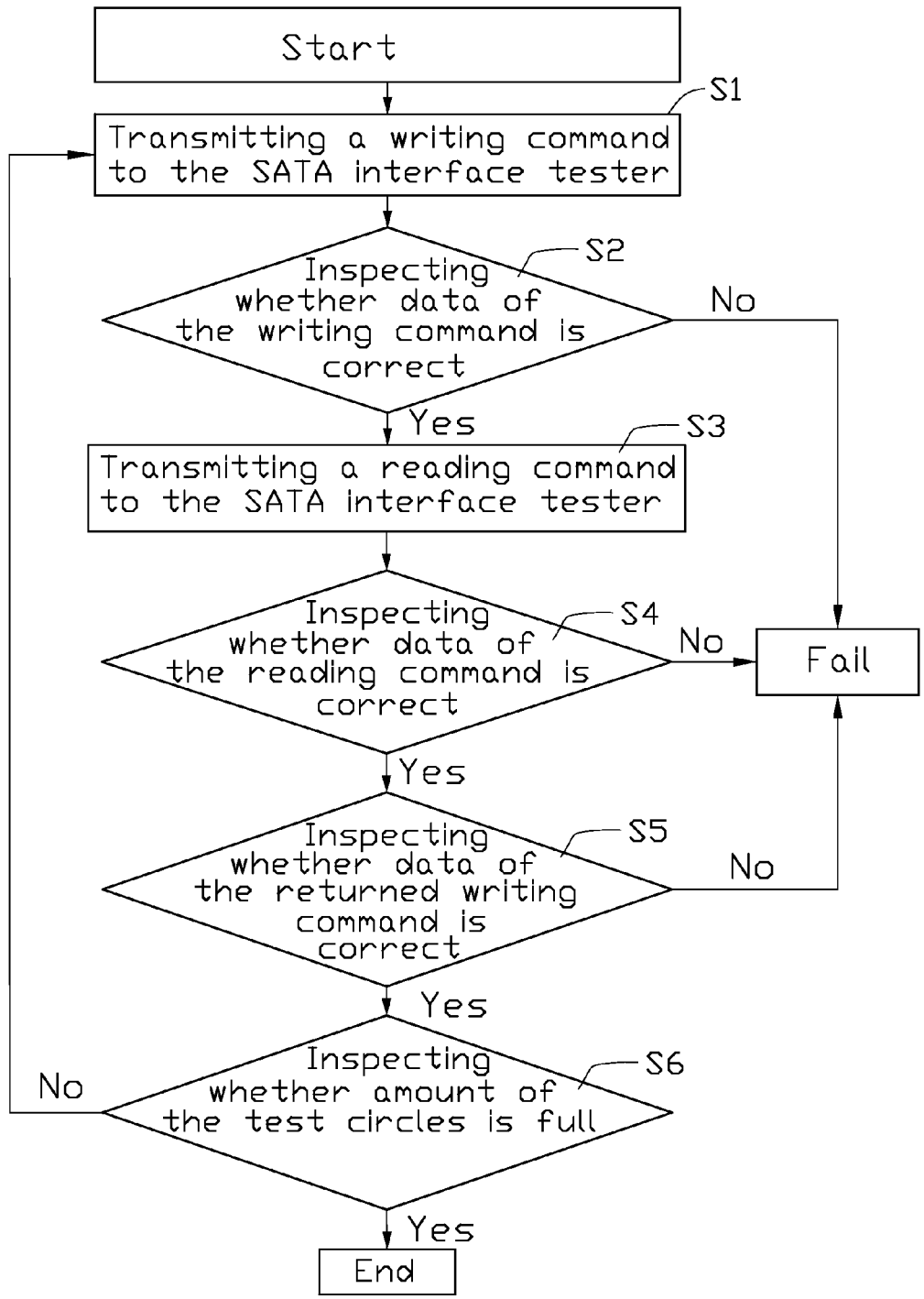
FIG. 2 is a flow chart of a SATA interface testing method which uses the SATA interface tester of FIG. 1.

Referring also to FIG. 2, a SATA interface testing method which uses the SATA interface tester includes the following steps.

Step S1: when the testing programs of the BIOS and the memory 120 perform the writing process, the testing program of the BIOS transmits a writing command to the memory 120 via the SATA interface 140 and the signal converter 130. The data of the writing command includes an address value, a writing code, and writing data. The address value is obtained by multiplying the test value by the current value stored in the counter of the motherboard. The writing data is obtained by performing an exclusive OR (XOR) logic operation between the address value and the test value of the BIOS.

Step S2: the testing program of the memory 120 inspects whether the data of the writing command transmitted from the motherboard via the SATA interface thereof is correct. The inspecting step comprises inspecting the address value and the writing data. If the address value is not equal to a product of the test value and the current value stored in the counter of the memory 120, the indicator 110 will indicate a failing signal to users to indicate the tested one of the SATA interfaces of the motherboard is bad. If the address value is equal to the product of the test value and the current value stored in the counter of the memory 120, the testing program of the memory 120 will inspect the writing data of the writing command. If the writing data is not equal to a value obtained by performing an XOR logic operation between the address value and the test value of the memory 120, the indicator 110 will indicate a failing signal to users to indicate the tested one of the SATA interfaces of the motherboard is bad. If the writing data is equal to the value obtained by performing an XOR logic operation between the address value and the test value of the memory 120, the writing data is saved in the memory 120.

Step S3: when the testing programs of the BIOS and the memory 120 perform the reading process, the testing program of the BIOS transmits a reading command to the memory 120 via the SATA interface 140 and the signal converter 130. The data of the reading command includes an address value, which is the same as the address value of the writing command, and reading data.

Step S4: the testing program of the memory 120 inspects whether the data of the reading command is correct. If the address value is not equal to a product of the test value and the current value stored in the counter of the memory 120, the indicator 110 will indicate a failing signal to users to indicate the tested one of the SATA interfaces of the motherboard is bad. If the address value is equal to a product of the test value and the current value stored in the counter of the memory 120, the memory 120 reads the writing data saved in the memory 120, and then returns the writing data to the motherboard.

Step S5: the testing program of the BIOS inspects whether the returned writing data is correct. If the returned writing data is not equal to the value obtained by performing an XOR logic operation between the address value and the test value of the BIOS, the BIOS transmits an indicating command to the memory 120, and then the memory 120 controls the indicator 110 to indicate a failing signal to users to indicate the tested one of the SATA interfaces of the motherboard is bad. If the returned writing data is equal to the value obtained by performing an XOR logic operation between the address value and the test value of the BIOS, one test circle from the step S1 to the step S5 ends. The steps S1 to S5 is one test circle, and an amount of the test circles can be programmed by users according to need.

Step S6: the testing program of the BIOS inspects whether the amount of the test circles is full. In this embodiment, the BIOS includes a circle counter configured for counting the amount of the test circles and the circle counter is initialized at zero. When a test circle ends, the current value stored in the circle counter of the BIOS is incremented by one. When the current value stored in the circle counter of the BIOS is equal to the amount of the test circles programmed by users, namely the amount of the test circles is full, the test will end. If all of the test circles are passed, then the tested one of the SATA interfaces of the motherboard is quality approved. If any one of test circles is failed, then the tested one of the SATA interfaces of the motherboard is quality unapproved.

Users using the SATA interface tester and corresponding testing method do not need a SATA HDD to test the SATA interface of the motherboard. In addition, the SATA interface tester and corresponding testing method has a better testing level than using the SATA HDD.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A testing method for testing serial advanced technology attachment (SATA) interfaces of a motherboard, the method comprising:
   providing a SATA interface tester comprising:
      a memory;
      a signal converter;
      at least one SATA interface configured to connect with the SATA interfaces of the motherboard, and electrically connected to the memory via the signal converter, the signal converter capable of receiving serial signals from the motherboard via the at least one SATA interface of the tester and converting them to parallel signals and then passing the parallel signals to the memory to perform a writing process, the signal converter capable of receiving parallel signals from the memory and converting them to serial signals and then passing the serial signals to the motherboard via the at least one SATA interfaces of the tester to perform a reading process; and
      an indicator electrically connected to the memory for indicating testing results of the SATA interfaces of the motherboard;
   connecting at least one SATA interface of the motherboard to the at least one SATA interface of the tester;
   transmitting a writing command to the memory via the at least one SATA interface of the tester from the motherboard;
   inspecting whether data of the writing command is correct, if the data of the writing command is wrong, indicating a failing result to indicate the tested at least one of the SATA interfaces of the motherboard is bad by the indicator, if the data of the writing command is correct, saving the data of the writing command in the memory;
   transmitting a reading command to the memory via the at least one SATA interface of the tester from the motherboard;
   inspecting whether data of the reading command is correct, if the data of the reading command is wrong, indicating a failing result to indicate the tested at least one of the SATA interfaces of the motherboard is bad by the indicator, if the data of the reading command is correct, the data of the writing command saved in the memory being returned to the motherboard via the signal converter and the at least one SATA interface of the tester; and
   inspecting whether the returned data of the writing command is correct, if the returned data of the writing command is wrong, indicating a failing result to indicate the tested at least one of the SATA interfaces of the motherboard is bad by the indicator, if the returned data of the writing command is correct, indicating the tested one of the SATA interfaces of the motherboard is good by the indicator.

2. The testing method as claimed in claim 1, wherein the data of the writing command comprises an address value, and writing data, the address value is obtained by multiplying a test value by a current value stored in a counter of the motherboard, the writing data is obtained by performing an exclusive OR (XOR) logic operation between the address value and the test value of the motherboard.

3. The testing method as claimed in claim 2, wherein if the address value is not equal to a product of the test value and the current value stored in the counter of the memory, the data of the writing command is wrong, and if the writing data is not equal to a value obtained by performing an XOR logic operation between the address value and the test value of the memory, the data of the writing command is wrong.

4. The testing method as claimed in claim 3, wherein the data of the reading command comprises an address value, which is the same as the address value of the data of the writing command, and reading data.

5. The testing method as claimed in claim 4, wherein if the address value is not equal to a product of the test value and the current value stored in the counter of the memory, the data of the reading command is wrong.

6. The testing method as claimed in claim 5, wherein if the returned data of the writing command is not equal to the value obtained by performing an XOR logic operation between the address value and the test value of the motherboard, the returned data of the writing command is wrong.

7. The testing method as claimed in claim 1, further comprising repeating the above steps once again.

* * * * *